(12) United States Patent
Mierle

(10) Patent No.: US 9,747,630 B2
(45) Date of Patent: Aug. 29, 2017

(54) SYSTEM AND METHOD FOR ENABLING ONLINE ORDERING USING UNIQUE IDENTIFIERS

(71) Applicant: Locu, Inc., San Francisco, CA (US)

(72) Inventor: Keir Mierle, San Francisco, CA (US)

(73) Assignee: Locu, Inc., San Francisco, CA (US)

( * ) Notice: Subject to any disclaimer, the term of this patent is extended or adjusted under 35 U.S.C. 154(b) by 547 days.

(21) Appl. No.: 14/296,331

(22) Filed: Jun. 4, 2014

(65) Prior Publication Data

US 2014/0330681 A1   Nov. 6, 2014

Related U.S. Application Data

(63) Continuation-in-part of application No. 14/267,686, filed on May 1, 2014.

(60) Provisional application No. 61/818,736, filed on May 2, 2013, provisional application No. 61/818,713, filed on May 2, 2013.

(51) Int. Cl.
*G06Q 30/06* (2012.01)

(52) U.S. Cl.
CPC ........ *G06Q 30/0637* (2013.01); *G06Q 30/06* (2013.01); *G06Q 30/0623* (2013.01); *G06Q 30/0631* (2013.01); *G06Q 30/0635* (2013.01); *G06Q 30/0641* (2013.01); *G06Q 30/0643* (2013.01)

(58) Field of Classification Search
CPC .............. G06Q 30/0637; G06Q 30/06; G06Q 30/0623; G06Q 30/0631; G06Q 30/0641; G06Q 30/0643; G06Q 30/0633; G06Q 30/0256; G06Q 30/0244

USPC ............................ 705/26.7, 26.8, 27.1, 27.2
See application file for complete search history.

(56) References Cited

U.S. PATENT DOCUMENTS

| | | | |
|---|---|---|---|
| 5,228,123 A | 7/1993 | Heckel | |
| 5,978,848 A * | 11/1999 | Maddalozzo, Jr. | ........................ G06F 17/30902 707/999.01 |
| 5,991,739 A * | 11/1999 | Cupps | .................... G06Q 10/08 705/26.61 |
| 6,134,588 A | 10/2000 | Guenthner et al. | |
| 6,317,128 B1 | 11/2001 | Harrison et al. | |
| 6,405,192 B1 | 6/2002 | Brown et al. | |
| 6,981,210 B2 | 12/2005 | Peters et al. | |
| 7,000,184 B2 | 2/2006 | Matverenko et al. | |

(Continued)

OTHER PUBLICATIONS

Gianoutsos, W4: A World Wide Web Browser with CSWC Support, 1996.
Vetter, Mosaic and the World-Wide Web, 1994.

*Primary Examiner* — Yogesh C Garg
(74) *Attorney, Agent, or Firm* — Quarles & Brady LLP

(57) ABSTRACT

A system and method for automatically submitting an online order from a customer to a restaurant. Input data and customer data is used by an order engine to select a deployment platform, such as social media networks, search engines, mobile applications, and related websites, for a user interface. The order engine provides a unique identifier for each restaurant. The unique identifier can be used by third parties, such as online content providers, to return the menu for the restaurant included in the third party content. The user interface automatically populates the restaurant's menu options and business data, allowing the customer to build an order. The order engine submits the order to the restaurant via a non-verbal communication platform.

20 Claims, 9 Drawing Sheets

(56) References Cited

U.S. PATENT DOCUMENTS

| | | | |
|---|---|---|---|
| 7,032,030 B1 | 4/2006 | Codignotto | |
| 7,392,293 B2 | 6/2008 | Leonik | |
| 7,716,602 B2 | 5/2010 | Etgen | |
| 7,743,334 B2 | 6/2010 | Rider | |
| 8,385,589 B2 | 2/2013 | Erol et al. | |
| 8,788,926 B1* | 7/2014 | Kannan | G06F 3/1219 715/205 |
| 2002/0042821 A1 | 4/2002 | Muret et al. | |
| 2002/0049847 A1 | 4/2002 | McArdle et al. | |
| 2002/0073235 A1 | 6/2002 | Chen et al. | |
| 2002/0114192 A1 | 8/2002 | Takase et al. | |
| 2003/0023878 A1* | 1/2003 | Rosenberg | H04L 63/126 726/4 |
| 2004/0064822 A1* | 4/2004 | Noda | G06F 8/51 719/311 |
| 2004/0083307 A1 | 4/2004 | Uysal | |
| 2004/0205185 A1 | 10/2004 | Leonik | |
| 2004/0216042 A1* | 10/2004 | Consolatti | G06F 8/30 715/234 |
| 2004/0260807 A1 | 12/2004 | Glommen et al. | |
| 2005/0015468 A1 | 1/2005 | Lim et al. | |
| 2005/0223326 A1 | 10/2005 | Chang et al. | |
| 2006/0129635 A1 | 6/2006 | Baccou et al. | |
| 2006/0215824 A1 | 9/2006 | Mitby et al. | |
| 2006/0235694 A1 | 10/2006 | Cross et al. | |
| 2007/0088713 A1 | 4/2007 | Baxter et al. | |
| 2008/0126097 A1 | 5/2008 | Sarid et al. | |
| 2008/0262972 A1 | 10/2008 | Blake | |
| 2008/0307339 A1 | 12/2008 | Boro et al. | |
| 2009/0030774 A1* | 1/2009 | Rothschild | G06Q 30/02 705/14.1 |
| 2009/0222416 A1 | 9/2009 | Tymoshenko et al. | |
| 2009/0327101 A1 | 12/2009 | Sayed | |
| 2010/0121879 A1 | 5/2010 | Greenberg | |
| 2012/0059681 A1 | 3/2012 | Meyer et al. | |
| 2012/0116828 A1* | 5/2012 | Shannon | G06Q 10/0631 705/7.12 |
| 2012/0124462 A1* | 5/2012 | Bannoura | G06F 9/45516 715/234 |
| 2012/0278253 A1* | 11/2012 | Gahlot | G06Q 30/0201 705/347 |
| 2012/0296679 A1 | 11/2012 | Im | |
| 2014/0013261 A1* | 1/2014 | Shibata | G01C 21/26 715/771 |

* cited by examiner

*32*

| File Edit Tools | ⇐ ⇒ |

MAIN COURSES
All main dishes are served with Rice, onions & tomato

Beriyani ..................9.99
Chicken Beriyani ......12.99
Beef Beriyani...........13.99
Lamb Beriyani..........15.99

CHICKEN
Chicken shawarma....12.99
Chicken saute..........12.99
(Chicken cutlet cubes sautéed with garden vegetables in a garlic-tomato sauce)

LAMB
Babylon Shish Kebab...16.99
(Tiny chunks of lamb grilled over charcoal on skewers)
Lamb Chops...............18.99
(Baby lamb chops grilled to your taste)

BEEF
Kebab.....................13.99
Beef shawarma.........13.99
(Tiny chunks of lamb grilled over charcoal on skewers)

COLD APPETIZERS
Hummus...................5.99
(chick-peas & garlic pureed w/tahini sauce)
Baba Ghanoush.........5.99
(Crushed barbequed Eggplant w/garlic, mixed w/ lemon juice & tahini sauce)
stuffed grape leaves...5.99
(Grape leaves delicately filled with rice and meat or vegetables)
Turshi ......................3.99
(Pickled garden vegetables finely chopped & marinated in a vinegar, lemon juice & spices)

Lebne.....................4.99
(Quart of yogurt with a hint of garlic)

SALADS
Shepherd Salad......5.99
(fresh tomatoes, cucumbers onions topped with black olives and parsley seasoned with vinegar and olive oil)
Tabouli...................5.99
(Mixture of cracked wheat, green onions, parsley and lettuce)
Fatoosh..................5.99
(Cucumber, tomatoes, onions and Babylonian style of dressing, chopped parsley, toasted and crumbled pita bread)

SOUPS
Lentil soup...............3.99
Vegetable soup........3.99
Chicken soup...........3.99

SANDWICHES
Chicken & Beef Shawarma
Large......................7.99
Small.......................6.99
Shish Kebab
Large......................7.99
Small......................6.99
Falafel
Large......................5.99
Small......................3.99

HOT APPETIZER
Falafel....................4.99
(Chick peas and chopped vegetables, fried Babylon style)
Boerek....................6.99
(Rolls stuffed with meat or vegetables)

Kibbeh...................8.99
Arabic pastries
With meat..............2.99
With spinach..........1.99
With cheese...........1.99
With zaatar............1.99
Dolma....................5.99
(Peppers topped with meat and rice)

EXTRA GOODIES
French Fries
Small.....................3.99
Large.....................4.99
White basmati (Rice).2.99
Brown basmati (Rice).3.99

DESSERTS
Baklava.................3.99
Rice pudding.........4.99
(Pudding made by baking rice, milk and sugar)
Brown top pudding..4.99
(Milk pudding sprinkled with cinnamon)
Basbusa................3.99

BEVERAGES
Ayran....................1.99
(Refreshing cold yogurt drink)
Arabic Coffee........2.99
Babylonian Tea......1.99
Sodas...................1.99
Water...................0.99

EVERYDAY SPECIAL PLATES

| File Edit Tools | ⇐ ⇒ |

SUBMIT ORDER

MAP TO CITIZENS BAND

302

CITIZENS BAND

1198 FOLSOM ST. SAN FRANCISCO CA 94103

(415) 556-4901

316

| 1 | Steak | $24 |
| 1 | Arugula Salad | $9 |

Plus applicable taxes

Estimated Total   $33

Prices have not been verified by business and may Change at point of purchase

NAME: [Carl]  304

PHONE: [+1 415 562 1231]  306

In case you need to be contacted about your takeout order

EMAIL: [cjones@locu.com]  308

You will receive a confirmation email upon Submitting your order

PICKUP ORDER IN

○ 15 min.    ○ 30 min.    ○ 1 hour

310

312

[ SUBMIT FOR PICKUP ]

FIG. 6

SYSTEM AND METHOD FOR ENABLING ONLINE ORDERING USING UNIQUE IDENTIFIERS

CROSS-REFERENCE TO RELATED APPLICATIONS

This application is a continuation-in-part of, is based on, claims the benefit of, and incorporates herein by reference U.S. patent application Ser. No. 14/267,686 filed May 1, 2014 and entitled "METHOD FOR MANAGEMENT OF ONLINE ORDERING," which is based on and claims priority to U.S. Provisional Patent Application Ser. No. 61/818,736 filed on May 2, 2013 and entitled "SYSTEMS AND METHODS FOR CROSS-MEDIUM AUTOMATIC TYPESET MENUS, FRICTION-FREE ORDERING, AUTOMATIC WEB PRESENCE CREATION, AND AUTOMATED SEARCH ENGINE MARKETING" and U.S. Provisional Patent Application Ser. No. 61/818,713 filed on May 2, 2013 and entitled "SYSTEMS AND METHODS FOR AUTOMATED DATA CLASSIFICATION, MANAGEMENT OF CROWD WORKER HIERARCHIES, AND OFFLINE CRAWLING."

BACKGROUND OF THE INVENTION

The present invention relates to systems and methods for web-based restaurant ordering or other retail ordering. More particularly, the invention relates to systems and methods for automatically submitting online orders from a customer to a business using an order engine to optimize online ordering efficiency and to automate online ordering for the business.

In today's fast-paced world, many people do not always have the time to cook at home nor the energy to dine out. Instead, they turn to carry-out and/or delivery restaurants. Typically, to place a carry out order a customer will either telephone the restaurant and place an order for pick-up or delivery, or stop by the restaurant to place the order and wait for the food to be prepared. Both of these methods have their downsides. For example, customers often call in to restaurants with a menu in hand, but the menu is one that has been lying around the house for years and is incorrect and outdated. Some restaurants are noisy and there are often significant communication problems, first verbal with the customer and then the cook or chef must decipher the employee order-taker's handwriting. Thus, resulting orders may not even turn out to be what the customer intended, resulting in a large margin for error and customer dissatisfaction throughout the process.

On the restaurant side, the nature of a telephone call demands immediate attention and this is often frustrating for employees fielding many calls and trying to serve the orders at the same time. It is also frustrating for customers if they sense that they do not have the employees' undivided attention. In sum, telephone ordering between a customer and a restaurant can be a frustrating and error-prone process, one that is not good for business.

As a result, there have been many attempts at in-house ordering systems to reduce error. For example, many fast food restaurants have graphical cash registers with icon representations of food items to avoid entry errors. The register then sends the order directly to the cooks to avoid transcription errors. However, no such level of automation currently exists in the carry-out world, where the telephone is still the primary means of communication.

Other ordering systems require the direct involvement of a restaurant owner in the form of a sign-up to a service and a relationship with the take-out order provider. The order is generally placed via a web page or a mobile application on the take-out service provider site or mobile application. However, this system requires the restaurant to sign-up for a dedicated take-out service which requires the issuer of the order to look-up and type in a full order and hope the restaurant will honor the order upon receipt.

Additionally, take-out ordering requires a plurality of challenging preconditions for both the customer and the business. For example, the customer must have access and knowledge of the business's menu. This requires the customer to find a physical menu or obtain a copy of the menu online which is time consuming and does not guarantee the customer has the most up-to-date menu. Further, the customer is required to know how to place an order. Some businesses have websites that customers can directly order from, however, other businesses may not even have a website and the customer is required to directly call the business to place an order. Customers are also required to know the location of the business they wish to place an order from relative to their present location. Knowledge of the distance between the customer's current location and the business determines whether the business will deliver, for example, or whether the customer is willing to travel to the business to pick up the order. The business, on the other hand, is required to determine the appropriate means of distributing order related information to the customer which can be time consuming and increase operational costs.

Thus, there is a need for a system and method for a service provider to offer restaurants an online ordering service for their customers that is more efficient and error-free than call-in ordering.

SUMMARY OF THE INVENTION

The present invention overcomes the aforementioned drawbacks by providing a system and method for automatically submitting an online order from a customer to a restaurant, without requiring the business to sign-up for a service prior to receiving orders. Input data and customer data is used by an order engine to select a deployment platform, such as social media networks, search engines, mobile applications, and related websites, for a user interface. The user interface automatically populates the restaurant's menu options and business data, allowing the customer to seamlessly build an order without redirecting the customer to a dedicated page or impacting the current design of the restaurant's menu. The order engine submits the order to the restaurant via a non-verbal communication platform. An automated confirmation call is generated to the restaurant confirming receipt of the order. From the confirmation call the restaurant may choose to repeat the message, accept the order, connect to the customer, connect to the service provider, decline the order, or opt-out. The order engine allows the restaurant to monitor online orders and to, optionally, enroll in the above services for subsequent online orders.

In accordance with one aspect of the invention, a system for enabling a user to submit an online order to a business is disclosed. The system includes a processor configured to access a non-transitory, computer-readable storage medium having stored thereon unique identifiers corresponding to input data related to corresponding businesses. The processor is configured to execute an order engine to carry out the steps of receiving, from an application running on a computer operated by the user, information to identify a business indicated within content displayed on the computer operated by the user. The order engine may also be configured to access the non-transitory, computer-readable storage medium to identify a unique identifier corresponding to the business using the information received from the application. Based on the unique identifier, the input data related to the business for display on the computer operated by the user is provided despite the business having no previously-established business relationship with the order engine. An online order to be placed with the business is received from the application running on the computer operated by the user, and the online order is submitted to the business. One or more response options are provided for the business to communicate acceptance of the online order.

In accordance with another aspect of the invention, a method for enabling a user to submit an online order to a business is disclosed. The steps of the method include receiving unique identifiers corresponding to input data related to corresponding businesses configured to be analyzed by an order engine. Information to identify a business indicated within content displayed on a computer operated by the user is received from an application running on the computer. A non-transitory, computer-readable storage medium is then accessed to identify a unique identifier corresponding to the business using the information received from the application. Based on the unique identifier, the input data related to the business for display on the computer operated by the user is provided despite the business having no previously-established business relationship with the order engine. An online order to be placed with the business is received from the application running on the computer operated by the user, and the online order to the business is then submitted. One or more response options are provided for the business to communicate acceptance of the online order.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 2 shows a representation of an example image of restaurant input data.

FIG. 6 shows an example screen shot of an example user interface including a menu widget showing an online order summary for the customer.

DETAILED DESCRIPTION OF THE INVENTION

This description primarily discusses illustrative embodiments as being implemented in conjunction with restaurant menus. It should be noted, however, that discussion of restaurant menus simply is one example of many different types of unstructured data items that apply to illustrative embodiments. For example, various embodiments may apply to unstructured listings from department stores, salons, health clubs, supermarkets, banks, movie theaters, ticket agencies, pharmacies, taxis, and service providers, among other things. Accordingly, discussion of restaurant menus is not intended to limit various embodiments of the invention.

Figure 1:
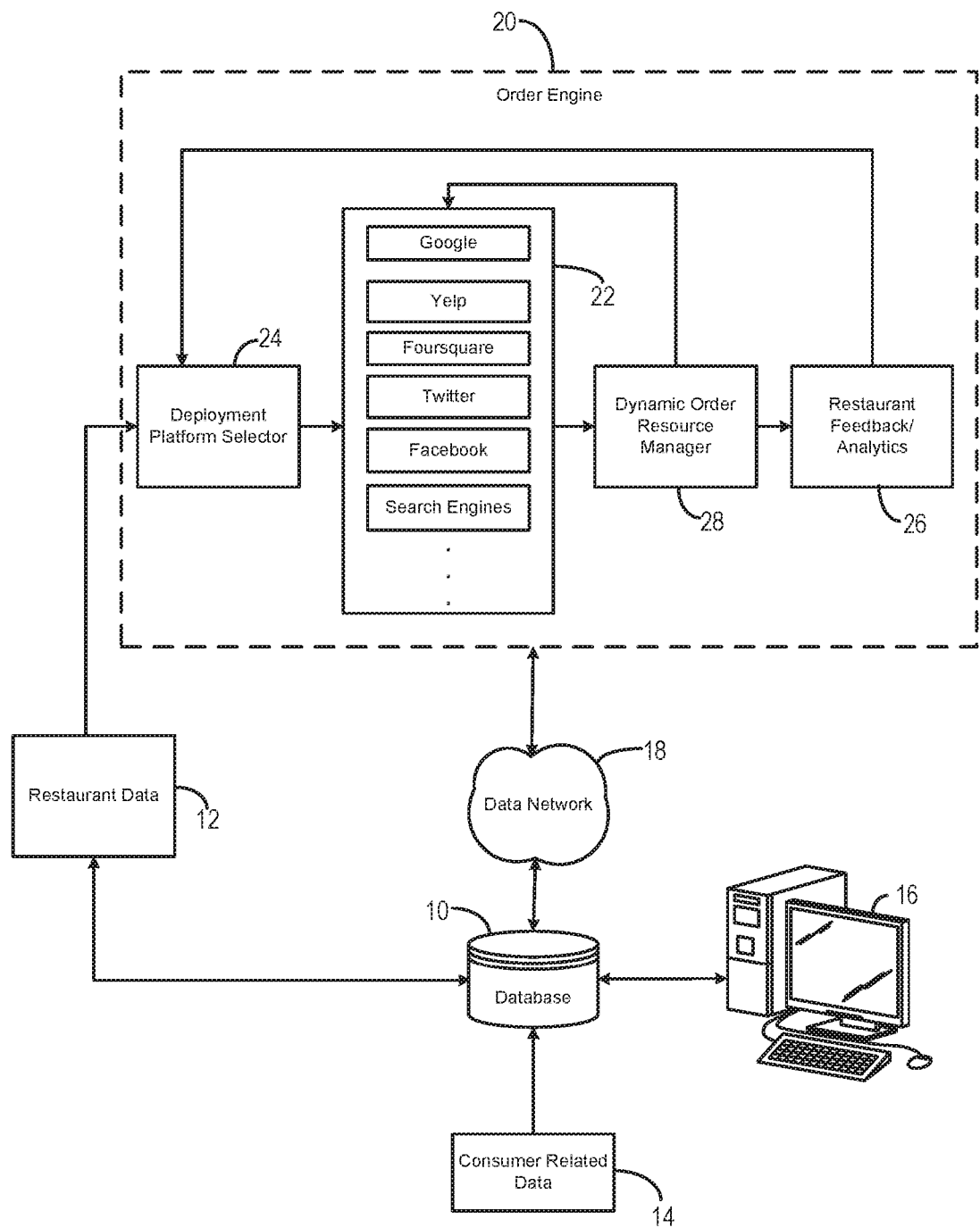
FIG. 1 is a schematic view of an environment in which an embodiment of the invention may operate.

Referring now to FIG. 1 a schematic view of an environment in which the invention may operate is shown. The environment includes one or more remote content sources 10, such as a database or non-transitory, computer-readable storage medium on which business input data 12 and consumer related data 14 corresponding to a business are stored. A processor 16 may be configured to access the remote content source 10 to store menu data, for example, related to the business input data 12, as well as store the consumer related data 14. The remote content source 10 is connected, via a data communication network 18 such as the Internet, to an order engine 20 in accordance with an embodiment of the invention.

As described in more detail below, the order engine 20 may be configured to receive the input data 12 and consumer related data 14 to determine which deployment platforms 22, such as search engines or social media networks, for example, the business's online ordering interface should be provided on in order to improve online ordering efficiency and increase online orders. As will be further described, the business input data 12 may include, but is not limited to, the business menu including a plurality of business offerings, the business location, the business phone number, the business fax number, the business delivery hours, the business pick-up hours, photographs of the plurality of business offerings, feedback data, and the like. The consumer related data 14 may include, but is not limited to, the consumer's first name, the consumer's email address, the consumer's street address, the consumer's phone number, an estimated delivery time for the online order, an estimated pick-up time for the online order, and the like.

The order engine 20 may include a deployment platform selector 24 that chooses, based upon, but not limited to the business input data 12, the consumer related data 14 and, as will be described, feedback from the business 26, which deployment platforms 22 to provide the online ordering interface on for customers to build and submit an online order (i.e., delivery order, take-out order, and the like) to the business. A dynamic order resource manager 28 may be configured to receive consumer related data 14 that corresponds to the consumer activity generated on the targeted deployment platforms 22 and determine which deployment platforms 22 increase online orders for a particular business (i.e., a restaurant). Based on the quantity of online orders, the order engine 20 may adjust the deployment platforms 22 to increase the business's online orders.

Figure 3:
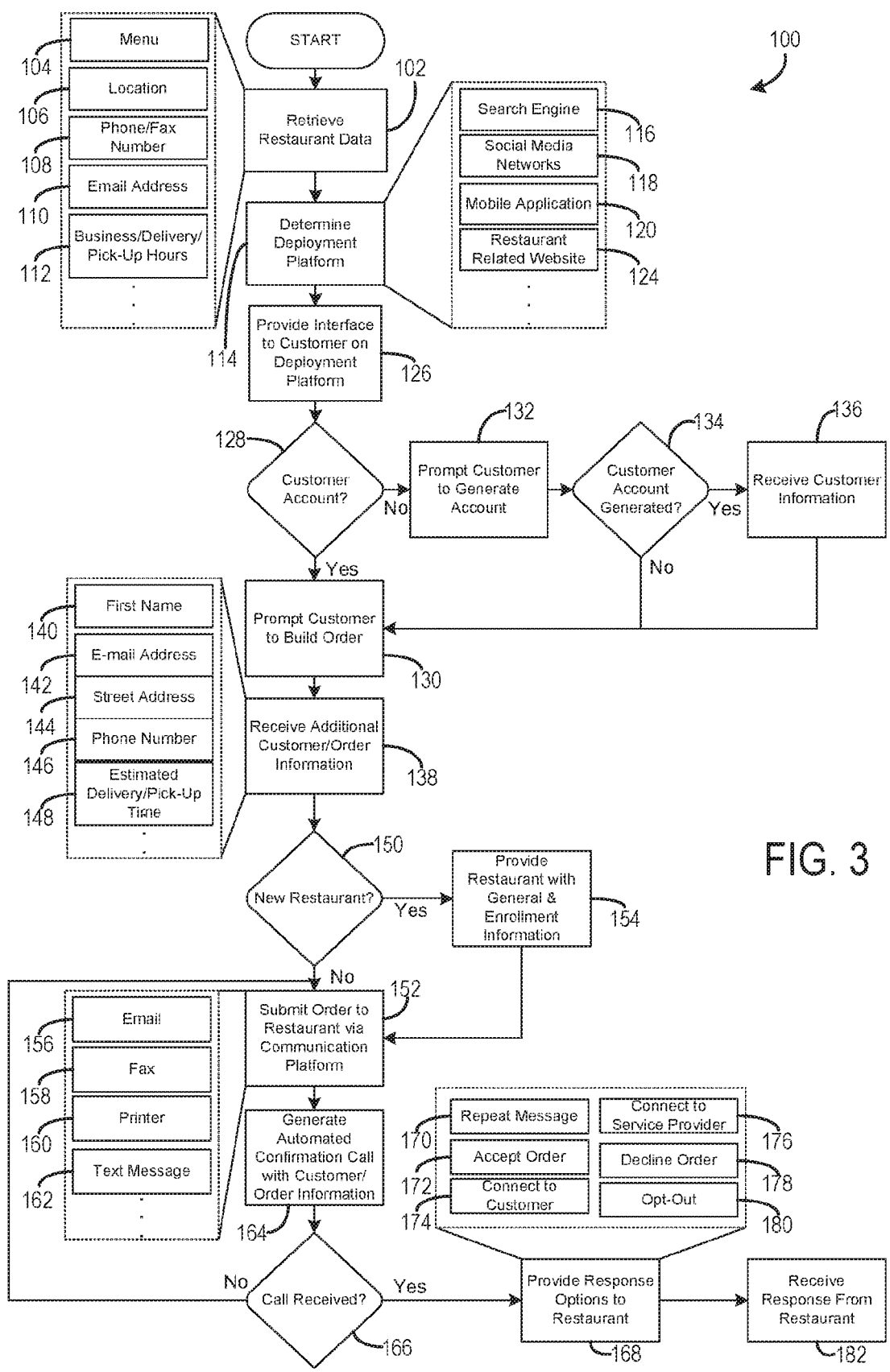
FIG. 3 is a flow chart setting forth the steps of processes for automatically submitting an online order from a customer to a business.

Referring now to FIG. 3, a flow chart setting forth exemplary steps 100 for automatically submitting an online order from a customer to a business via one or more deployment platforms is provided. To start the process, the business input data 12 of FIG. 1 is obtained at process block 102. In one non-limiting example, the business input data may be obtained by the order engine without involvement of the business. For example, the order engine may obtain business input data related to the business from existing online and offline information (e.g., a business menu, business website, business advertisements, and the like). The business input data may include any data related to the business, for example. As one non-limiting example, the business input data may be a menu, such as a restaurant menu, as shown at block 104. The menu shown at block 104 may include a plurality of business offerings, for example. If the business is a restaurant, the business offerings may include data obtained from a restaurant menu 32 as shown in FIG. 2, such as Menu Name, Section, Subsection, Section Text, Item Name, Item Description, Item Price, Item Options, and Notes. In addition, photographs of the business offerings (e.g., specific food dishes) may be included in the menu at block 104. In the particular example of FIG. 2, Sections include "Main Courses", "Chicken", "Lamb", "Beef", "Cold Appetizers", "Salads", "Soups", "Sandwiches", "Hot Appetizer", "Extra Goodies", "Desserts", and "Beverages". Item Names include "Beriyani", "Chicken Shawarma", and "Lamb Chop", for example. One Item Description is "Chicken cutlet cubes sautéed with garden vegetables in a garlic-tomato sauce". Item Prices include, but are not limited to, "9.99", "12.99", and "13.99". Item Options may include how well a meat dish is cooked (not shown in FIG. 2). Notes include "All main dishes are served with rice, onions & tomato". As may be understood, the business input data related to the business offerings are business-specific and may vary from one business to the next. Such data extraction and use is further detailed in U.S. Provisional Patent Application Ser. No. 61/818,713, filed May 2, 2013 and entitled "SYSTEMS AND METHODS FOR AUTOMATED DATA CLASSIFICATION, MANAGEMENT OF CROWD WORKER HIERARCHIES, AND OFFLINE CRAWLING," and U.S. patent application Ser. No. 13/605,051, filed Sep. 6, 2012 and entitled "METHOD AND APPARATUS FOR FORMING A STRUCTURED DOCUMENT FROM UNSTRUCTURED INFORMATION."

The business input data may also include a location of the business as shown at block 106. The business location 106 may include a business and/or home address, city, state, zip code and country, for example. A business phone number and/or fax number, as shown at block 108, may be another form of business input data retrieved at process block 102. In addition, a business email address, as shown at block 110 may be yet another from of business input data. Business hours, as shown at block 112, is business input data that may include the business's normal operating hours, specific delivery hours, specific hours for take-out orders, and the like. The business hours 112, along with the other business input data, is provided to the order engine 20 of FIG. 1 to automatically provide the online ordering interface, as will be described below, to different deployment platforms to optimize the business's online ordering efficiency and increase online orders.

The above-described business input data described with respect to blocks 104, 106, 108, 110, and 112 is used by the order engine 20 of FIG. 1 to determine which deployment platforms 22 to utilize. For example, a small restaurant may not see a large increase in online orders if the corresponding online ordering interface is provided on search engine interfaces, such as Google. The small restaurant may see a larger increase in online orders when the corresponding online ordering interface are put on a more location based deployment platform, such as Yelp. However, using the small restaurant example, it may be difficult, especially for smaller businesses, to determine which deployment platform to provide an online ordering interface to in order to increase online orders and manage the order efficiently. Therefore, once the order engine has received the business input data at process block 102, the deployment platforms may automatically be determined at process block 114.

Several deployment platforms are available for the order engine to choose from at process block 114. Some non-limiting examples are provided in FIG. 1. For example, search engines, as shown at block 116, may be an appropriate deployment platform to provide the online ordering interface to in the form of a search engine advertisement or widget, for example. Specific search engines, as shown at block 116, may be other deployment platform options and may include other search engine websites such as Yahoo or Bing, for example. Other deployment platforms may be social media networks, as shown at block 118. Social media networks 118 may include, but are not limited to, Yelp, Foursquare, Twitter, and Facebook. For example, the order engine may provide the online ordering interface in the form of advertisement on Facebook, or embed a widget on a social media network's or search engine's website to direct customers to the online ordering interface that corresponds to business's menu. Other deployment platforms may include mobile applications, such as those running on the IPHONE or ANDRIOD devices, as shown at block 120, or any website related to the business (e.g., the business's local website, the business's local Facebook page, and the like), as shown at block 124.

Figure 5:
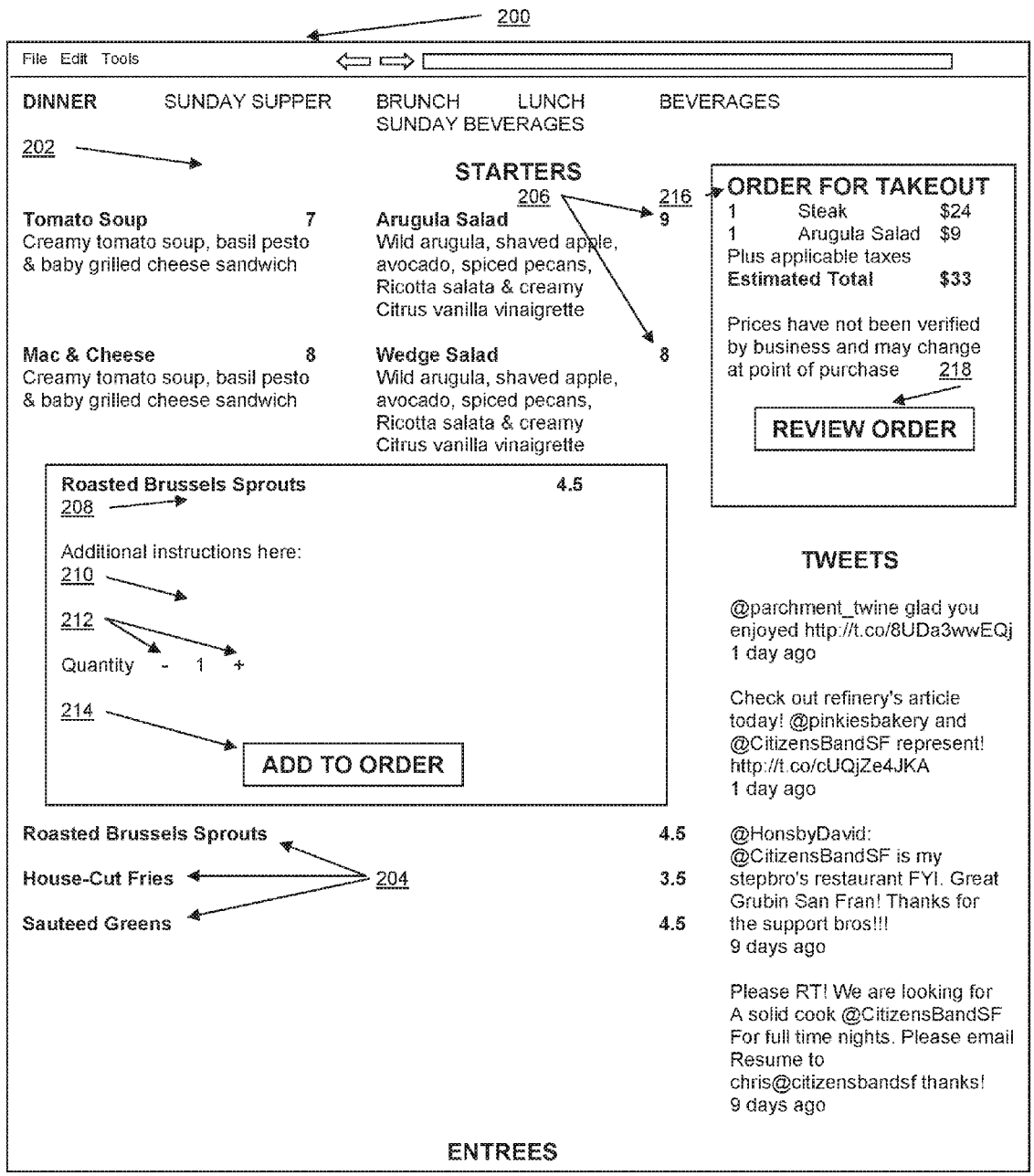
FIG. 5 shows an example screen shot of an example user interface by which the customer can submit an online order to the business.

Once the deployment platform(s) has been determined at process block 114, the order engine may provide the online ordering interface to customers on the deployment platform at process block 126. An example online ordering interface is shown in FIG. 5 as user interface 200. The user interface 200 may include any of business input data as previously described. For example, the user interface 200 may include a restaurant menu 202 including a plurality of business offerings 204 and corresponding prices 206 for the customer to choose from. The restaurant menu 202 provided on the user interface 200 may be consistent with the menu provided by the business's local website and/or the business's physical menu provided at the business location. The order engine may automatically display the business input data on the user interface 200 via a simple menu-item selection interface, for example, to allow the customers to easily build an online order. As previously described, the order engine may obtain the business input data, without the involvement of the business, to be displayed on the user interface 200. Thus, the order engine can provide some or all of the business input data to facilitate take-out ordering that provides a seamless experience to the customer and drives customers to the business.

Returning to FIG. 3, once the online ordering interface is provided to the customer at process block 126, the order engine may determine if the customer has a customer account at decision block 128. In one non-limiting example, a log-in window (not shown) may be provided on the online ordering interface, such that if the customer does have an existing account, he/she may log-in and build the online order at process block 130. However, if the customer does not have a customer account at decision block 128, the order engine may prompt the customer to generate an account at process block 132. The customer is not required to generate an account in order to build an online order at process block 130. Thus, at decision block 134, the order engine determines if the customer generated an account. If the customer generates an account at decision block 134, the order engine may receive the customer information at process block 136. The customer information may include, for example, a username and password. Once the customer information is received at process block 136, the customer may build the online order at process block 130. However, if the customer does not generate a customer account at decision block 134, the order engine simply prompts the customer to continue and build the online order at process block 130.

To build the online order at process block 130, the customer may be provided the restaurant menu 202 on the user interface 200, as shown in FIG. 5. The customer may select one or more of the business offerings 204 to add to the online order. In one non-limiting example, if the customer selects one of the business offerings 204, a window 208 may appear on the user interface 200. The window 208 may include a brief description of the menu item, an instructions window 210 for the customer to provide specific requests related to the selected menu item, and buttons 212 to add or remove the menu item from the online order. Once the customer determines the quantity of the selected menu item to add to the order, an add to order button 214 may be provided on the window 208 for the customer to select.

Still referring to FIG. 5, as the customer selects the add to order button 214 for one or more of the business offerings 204, an order summary 216 is continuously updated on the user interface 200. The order summary 216 may include the selected menu items and corresponding prices, as well as an estimated total for the online order. Once the customer is finished building the online order, a review order button 218 may be selected, and a user interface 300, as shown in FIG. 6 and described in further detail below, is displayed to the customer.

Returning to FIG. 3, once the customer has completed the online order at process block 130, the order engine may receive additional customer and/or order information at process block 138, prior to submitting the order to the business. The customer related data may include, but is not limited to, the customer's name, as shown at block 140, the customer's e-mail address, as shown at block 142, the customer's street address, as shown at block 144, and the customer's phone number, as shown at block 146. The customer related data may also include information related to the order, such as an estimated delivery time or an estimated pick-up time of the order, as shown at block 148. The additional customer related data and order information acquired at process block 138 may be provided by the customer, for example, on the user interface 300 of FIG. 6.

The user interface 300 may provide a summary of the online order 316 with an estimated total for the selected menu items, for example. In addition, the user interface 300 may display the business input data 302 for the business, including the business name, business address, business phone number, and business hours (not shown). A name section 304 may also be provided for the customer to enter a name to be associated with the online order. Similarly, a phone number section 306 may be provided on the user interface 300 for the customer to enter a phone number in case the customer would need to be contacted about the online order. An email section 308 may also be provided for the customer to provide an email address to be associated with the online order. The email address may be required prior to the customer submitting an online order, such that a confirmation email from the order engine may be sent to the customer. The customer may manually enter the customer related data into the name section 304, the phone number section 306, and the email section 308 of the user interface 300. However, if the customer has an existing customer account, as determined at decision block 128, or the customer generated a customer account at decision block 134, the customer related data may automatically be populated on the user interface 300.

Still referring to FIG. 6, if the online order is a pick-up order, radio buttons 310 may be provided to the customer to identify an approximate time period (e.g., number of minutes) for which the order will be picked up at the business location. Similar radio buttons may be provided on the user interface 300 for the customer to select to identify an approximate time for which the order should be delivered to the customer's address or present location, for example. Once the customer has reviewed the order and entered the necessary customer and order information, a submit button 312 may be selected by the customer to submit the online order to the order engine. The order engine does not require the customer to provide payment information for the online order. In one non-limiting example, payment for the online order is handled between the customer and the business since take-out orders involve in-person pickups or delivery.

With reference again to FIG. 3, once the customer submits the online order, the order engine determines if the business (i.e., the restaurant) for which the online order was submitted has previously received online orders from the order engine at decision block 150. The order engine may access the remote content source 10 of FIG. 1 to determine whether the business has previously received online orders from the order engine. If the order engine determines that the business has not previously received online orders from the order engine at decision block 150, the order engine provides the restaurant with both general information related to the services provided by the order engine and enrollment information at process block 154. The general information, for example, may include information explaining why the business is receiving the online order. The enrollment information provided at process block 154 does not require the business to enroll in the services provided by the order engine. However, if the business does decide to enroll in the services provided by the order engine, business metrics, as will be described in further detail below, can be tracked in order to increase online orders for the business and provide efficient online ordering tools for the business.

However, if the order engine determines that the business has previously received online orders from the order engine at decision block 150, the order engine simply submits the online order to the restaurant via a communication platform at process block 152. To provide a more seamless experience, the communication platform provides contact information through a medium allowing written communication, for example. Thus, the recipient (i.e., the business) of the online order can process the order reliably, without requiring verbal communication. Some non-limiting examples of communication platforms for submitting the online order at process block 152 include email, as shown at block 156, such that the order engine sends an email containing the online order to the business. Alternatively a fax, as shown at block 158, including the online order may be sent to the business's fax machine from the order engine. Similarly, the order engine may send the online order to a printer, as shown at block 160, located at the business. Or, the order engine may send a text message, as shown at block 162, including the online order to the business.

Once the order engine submits the online order to the business at process block 152, the order engine generates an automated confirmation call at process block 164. The automated confirmation call may be generated, for example, to ensure someone at the business is made aware of the online order. The automated call may provide information related to the online order such as, the take-out service company providing the order, and the method through which the restaurant should have received the order (i.e., fax, email, print, etc.) at process block 152. The automated call may also provide information related to the online order such as, a common identifier for the customer issuing the order, such as the customer's first name 140 obtained at process block 138. Additionally, or alternatively, the time at which the customer will come and pick up the order or time desired for the delivery may be information that is provided by the automated confirmation call. Lastly, in one non-limiting example, an estimate of the amount to be paid for the online order may be provided in the automated confirmation call to the business at process block 164. By providing the amount of the online order, the order engine (i.e., service provider) can instill more confidence that the automated confirmation call is legitimate and that the business should attend to the online order.

Once the automated confirmation call to the business is generated at process block 164, the order engine determines if the confirmation call was received by the business at decision block 166. For example, if the automated call fails due to a busy signal or the detection of an incorrect phone number for the business, the order engine determines that the call was not received at decision block 166. Thus, if the call is not received at decision block 166, the order engine may attempt to submit the online order to the business again at process block 152. This process may continue until the order engine determines that the automated confirmation call is received by the business at decision block 166. However, if the order engine continues to determine that the confirmation call was not received by the business, the online order may be sent to a specialist that will attempt to reach the restaurant manually to update the status of the order. If the specialist cannot get through to the business, the consumer who issued the online order may be notified of the failed attempt to get his/her order through. Thus, the order engine does not issue a confirmation to the customer until confirmation that the business has received the details of the order via the communication platform is determined at decision block 166.

If the order engine determines that the automated confirmation call is received by the business at decision block 166, response options are provided to the business at process block 168. The response options include, but at not limited to, repeat the message, as shown at block 170, accept the order, as shown at block 172, connect to the customer, as shown at block 174, connect to the service provider (e.g., the order engine), as shown at block 176, decline the order, as shown at block 178, and opt-out from receiving future online orders from the order engine, as shown at block 180. Once the automated confirmation call has provided the response options to the business at process block 168, the order engine receives a response from the business at process block 182. The response from the business at process block 182 may be one or more of the response options provided at process block 168.

Figure 4:
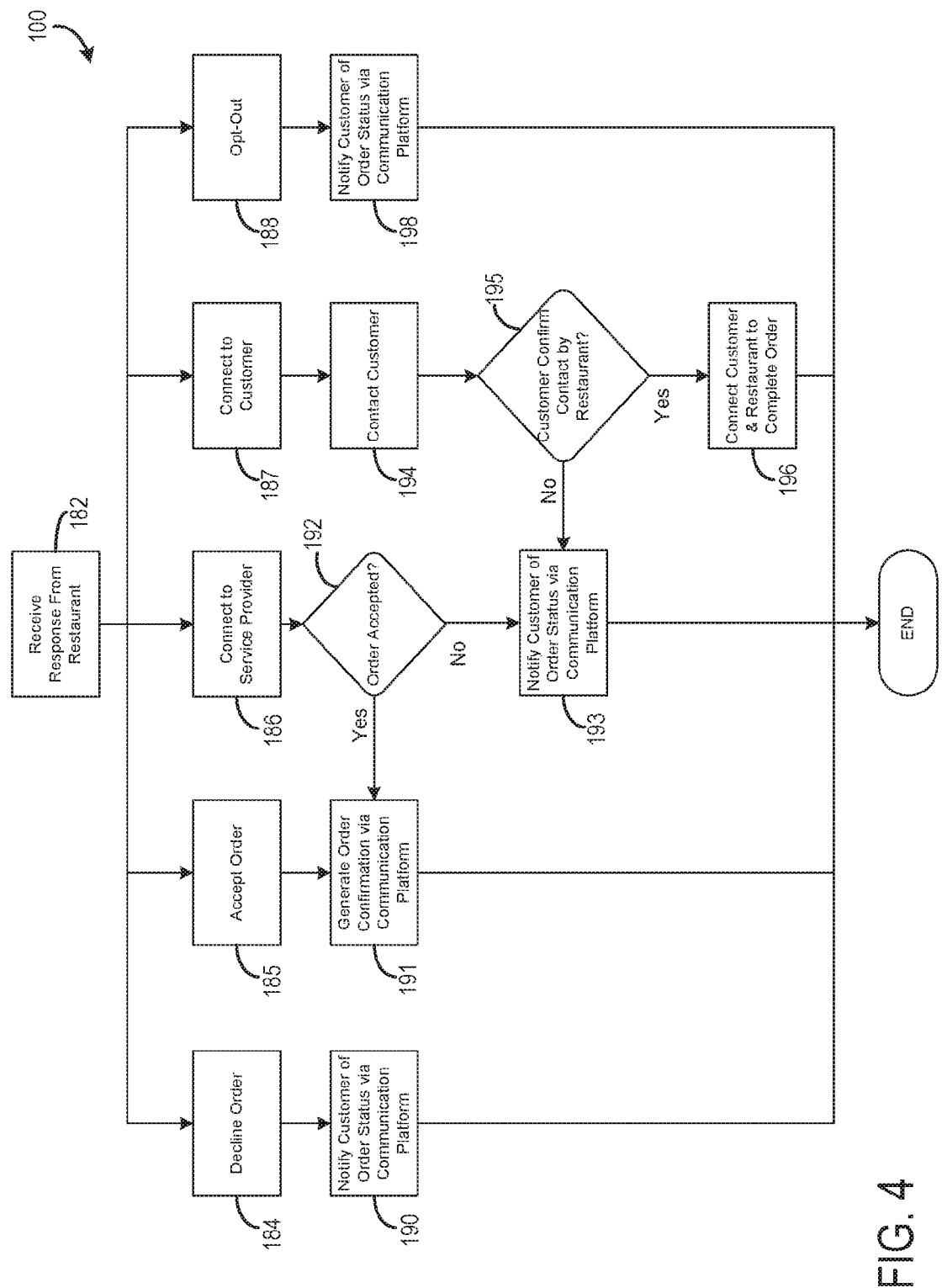
FIG. 4 is a continuation of the flow chart of FIG. 3.

Turning now to FIG. 4, the flow chart of FIG. 3 is continued setting forth the exemplary steps 100 for automatically submitting the online order from the customer to the business. Depending on the response received from the business at process block 182, the processes provided by the order engine may vary. For example, if the business chooses to decline the order, as shown at process block 184, the order engine may be configured to automatically notify the customer via a communication platform that the online order will not be processed by the business at process block 190. The communication platform used to notify the customer may be email, phone, or text message, for example, since the customer related data (i.e., email address and phone number) was previously obtained by the order engine at process block 138 of FIG. 3. Thus, when the customer is notified of the order status at process block 190, the message generated by the order engine may suggest that the customer contact the business directly to complete the online order.

However, if the business chooses to accept the order, as shown at process block 185, the order engine may be configured to automatically send an order confirmation message to the customer via the communication platform, as shown at process block 191. The order confirmation message may communicate to the customer that the online order will be processed by the business. The communication platform used to notify the customer may be email, phone, or text message, for example. Once the order confirmation message is sent to the customer at process block 191, the customer can expect the online order to be delivered at the pre-specified time (i.e., if the order was scheduled as a delivery). If the online order was a take-out order for pick-up, the customer can arrange to pick-up the order at the time identified on the user interface 300 of FIG. 6. Thus, the order engine in no longer communicating with the customer after the order confirmation message is sent at process block 191.

At process block 186, the business may choose to connect to the service provider. For example, if the business is hesitant about the online order received by the order engine, connecting to the service provider can reassure the business that the online order received at process block 152 of FIG. 3 is legitimate. Once the business is in communication with the service provider, the online order can either be accepted or declined by the business. At decision block 192, the order engine determines if the online order is accepted or declined. If the order is accepted at decision block 192, the order engine, as previously described, may automatically send an order confirmation message to the customer via the communication platform, as shown at process block 191, and the customer can expect the online order to be delivered at the pre-specified time or the customer can arrange to pick-up the order at the time identified on the user interface 300 of FIG. 6. Similarly, if the order is declined at decision block 192, the order engine may automatically notify the customer via the communication platform that the online order will not be processed by the business at process block 193, and the order engine may suggest that the customer contact the business directly.

At process block 187, the business may choose to connect to the customer. Before the order engine connects the business to the customer, the order engine may be configured to contact the customer via one of the communication platforms, as shown at process block 194, to verify that customer would like to connect with the business. If the customer confirms the connection at decision block 195, the order engine connects the customer and the business to complete the online order transaction at process block 196. However, if the customer does not confirm the connection to the business at decision block 195, the order engine may automatically notify the customer via the communication platform that the online order will not be processed by the business at process block 193, and the order engine may suggest that the customer contact the business directly.

Lastly, at process block 188, the business may choose to opt-out from receiving further online orders from the order engine. Once the business opts-out, the order engine may automatically notify the customer via the communication platform that the online order will not be processed by the business at process block 198, and the order engine may suggest that the customer contact the business directly.

Once the online order is complete, the business may decide to enroll in the services provided by the order engine. The business may contact the service provider operating the order engine from the enrollment information received at process block 154 of FIG. 3. The order engine may send incentives to the business as the online orders are received. In one non-limiting example, a predefined limit to the quantity of orders the business is entitled may be defined in an enrollment contract, for example, or an explicit deadline upon which the business needs to sign-up for the service to continue receiving orders may be specified.

If the business decides to enroll in the services provided by the service engine, the business may receive synchronous feedback with asynchronous ordering to bring more take-out traffic to the business. This can be accomplished by configuring the order engine to track business metrics, such as recording the quantity of consumer orders related to the different deployment platforms that the online ordering interfaces are provided on, as well as, tracking revenues received from the consumer orders. As a result of the consumer orders, consumer related data 14 shown in FIG. 1 may then be obtained. Once the consumer related data has been obtained, the data may be stored in the remote content source 10 of FIG. 1 for retrieval by the order engine 20 at any time. Thus, the order engine 20 may be continuously updating the online orders to optimize the business's online ordering efficiency and increase the quantity of online orders.

In one non-limiting example, search engine data, such as keywords searched by consumers on the deployment platforms, may be consumer related data obtained and used by the dynamic order resource manager to generate a search engine optimization (SEO) strategy for the business. The SEO strategy may include, for example, generating a list of business specific keywords based upon some, or all, of the business input data obtained at process block 102 of FIG. 3. For example, in the case where the business is a restaurant, the order engine may determine that the menu items offered by the restaurant may be candidate keywords for the keyword list. With reference to the menu 32 in FIG. 2, for example, the order engine may determine that menu items, such as "Chicken beriyani" and "Beef Beriyani" are adequate keywords to include in the SEO strategy. These menu items may be good candidates for the keyword list because they can target consumers that are searching for the offering provided by the business. Additionally, or alternatively, the list of keywords can be based on the business type or sub-type (e.g., cuisines), business name (e.g., Dim Sum, Restaurant), menu item prices, or any other business input data obtained at process block 102.

Once the SEO strategy is generated, the deployment platform(s) is determined for the online ordering interface. The deployment platform may include, but is not limited to, search engines, social media networks, mobile applications, and business related websites, as previously described. Thus, the SEO strategy can bring more take-out traffic to select businesses, and the take-out service provider can optionally drive more traffic to take-out web-pages, for example by purchasing relevant keywords for the business. By driving traffic to specific businesses and in conjunction with limits on orders for a particular business, the take-out service provider can sign-up more businesses for its service. In one non-limiting example, the SEO strategy may use customizable JavaScript based menu widgets. The JavaScript may run in the customer's browser. Additionally, or alternatively, if the JavaScript is a Google Chrome Extension, the online ordering interface including the business's menu could be returned with the search results entered by the customer.

The take-out service provider can optionally provide businesses the ability to enable ordering capability directly from the business's own website, mobile site or Facebook page, mobile applications (e.g., running on the IOS or ANDRIOD operating system), and the like. Thus, the order engine can provide the business with an SEO friendly stylized widget powered menu, for example, on its website having built-in take-out functionality. Furthermore, if the take-out service provider powers menu widgets on third party company websites or drives content in mobile applications, for example, it can further expand the reach of its service by enabling take-out widgets on these online properties or mobile applications.

In another non-limiting example, the order engine can utilize a unique identifier, such as a number, for each business that it has stored in the remote content source 10 of FIG. 1. The unique identifier can be used by third parties, such as online content providers, to include the menu for a given business in a listing, a review, and the like. Thus, the order engine may can accommodate situations where the third party knows the unique identifier and/or work with content providers and/or users of content provider sites to provide information from the order engine to reach end users. If the unique identifier is known, a widget or small JavaScript, for example, can be used by the third party to identify businesses included in the content and communicate with the order engine to return the menu for the business included in the third party content. Alternatively, if the unique identifier is not known, the widget or small JavaScript, for example, can be used by the third party or the end user to identify businesses included in the content and communicate with the order engine to return additional content, such as a menu, for the business included in the third party content.

Figure 7:
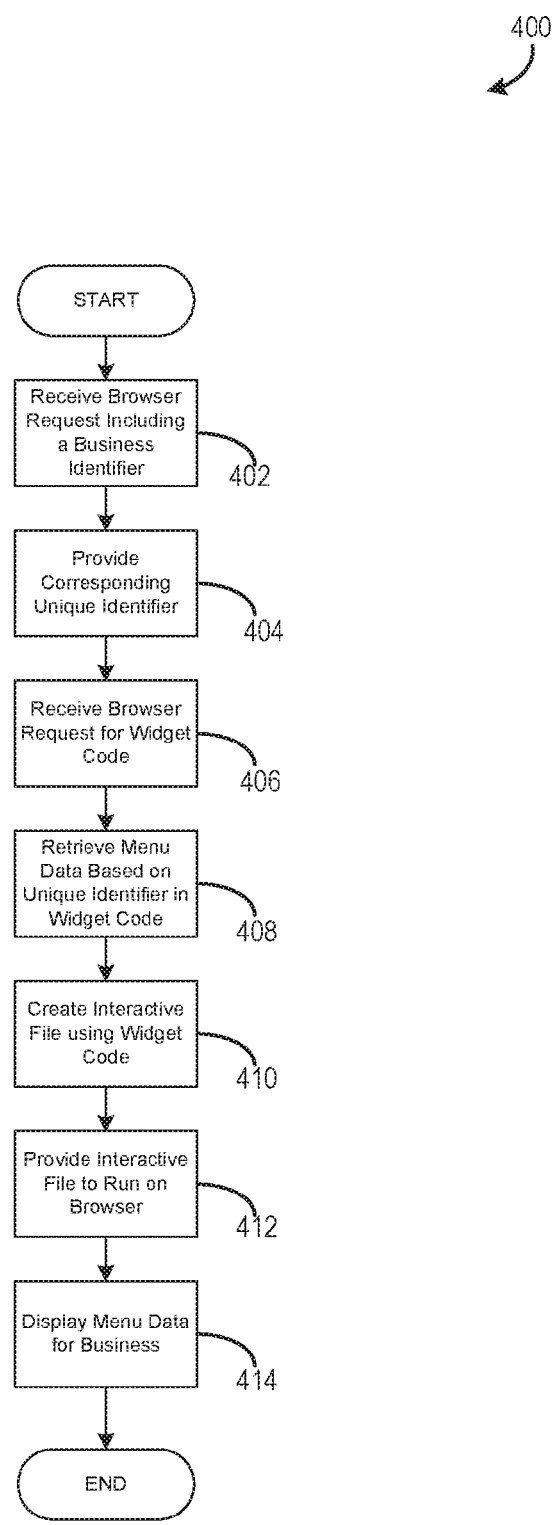
FIG. 7 is a flow chart setting forth the steps of processes for providing restaurant input data to a customer through a third party provider using unique identifiers.

Referring now to FIG. 7, a flow chart setting forth exemplary steps 400 for providing input data to a customer through a third party provider using unique identifiers is shown. Prior to starting the process, the third party (e.g., a publisher) may generate internal business identifiers that correspond to businesses, such as restaurants. The third party may interact with the order engine to map the internal business identifiers to the unique identifiers provided by the order engine. The order engine may further provide widget code, for example, that is embedded into the HTML file associated with the third party's online content. In one non-limiting example, the widget code may be stored on the remote content source 10 of FIG. 1 and may have the following format:

<script src="http://widget.locu.com/?locu_id={{locu_business_id}}">

Where the "locu_business_id" corresponds to the unique identifier provided by the order engine. The unique identifier may be an alphanumeric value, for example. Thus, to start the process, the order engine may receive a request from the browser including a business identifier (i.e., the identifier provided by the third party for a particular business) at process block 402. In response to the browser request, the browser may identify a widget tag, for example, in the HTML. In one non-limiting example, the widget tag may be stored by the local browser and may have the following format:

```
<scriptsrc="http://widget.locu.com/?locu_id=1234"
    element="menu_content">
```

Once the browser identifies the widget tag, the order engine may provide the unique identifier at process block 404 that corresponds to the business identifier provided by the third party. Next, at process block 406, the order engine may receive a browser request for the widget code from the remote content source, for example. In response, at process block 408, the order engine may retrieve the data (in this non-limiting example, menu data, "menu_content," identified in the widget tag) from the remote content source based on the unique identifier provided at process block 404 and included in the widget tag.

Next, at process block 410, the order engine may be configured to create an interactive file, for example a JavaScript file, using the widget code and the menu data embedded in the widget tag. Once the file is created, which may be an executable file, the order engine may provide the file to be run at process block 412. For example, the browser may run the widget code and find the menu data (i.e., the menu_content element identified in the widget tag) within the content provided. Then at process block 414, the menu data is displayed for the business corresponding to the unique identifier. Thus, the user is provided with an interactive widget, for example, for the business identified in the content provided by the third party.

In other cases, the unique identifier may not be known or stored by the third party and, thus, it may be desirable to provide input data to a customer despite the third party not knowing or storing the unique identifiers. In this case, the third party may provide business input data, such as a business name, address, and phone number as the business identifier, but not have a unique identifier to communicate to the order engine. The order engine may then map the business input data provided by the third party with the unique identifiers accessible by the order engine. The order engine may further provide widget code, for example, that supplements the third party's online content with further interactive business information. In one non-limiting example, the widget code may be stored on the remote content source 10 of FIG. 1 and may have the following format:

```
<script
src="http://widget.locu.com/?name={{name}}&address={{address}}&city={{city
}}">
```

Where the "name" corresponds to the business name provided by the third party. The "address" corresponds to the business address provided by the third party, and the "city" corresponds to the business city provided by the third party. Thus, the order engine matches the business input data (i.e., business name, address, and phone number) with the business input data stored on the remote content source. In some cases, the business input data may be inconsistent with the business input data stored, and accessible to the order engine, on the remote content source. For example, several phone numbers may be available for a particular restaurant. Therefore, the business phone number provided by the third party may be different from the business phone number for the same restaurant that is stored on the remote content source for the order engine. In such cases, a machine learning algorithm and elastic search strategy may be utilized, as will be described in further detail below.

Figure 8:
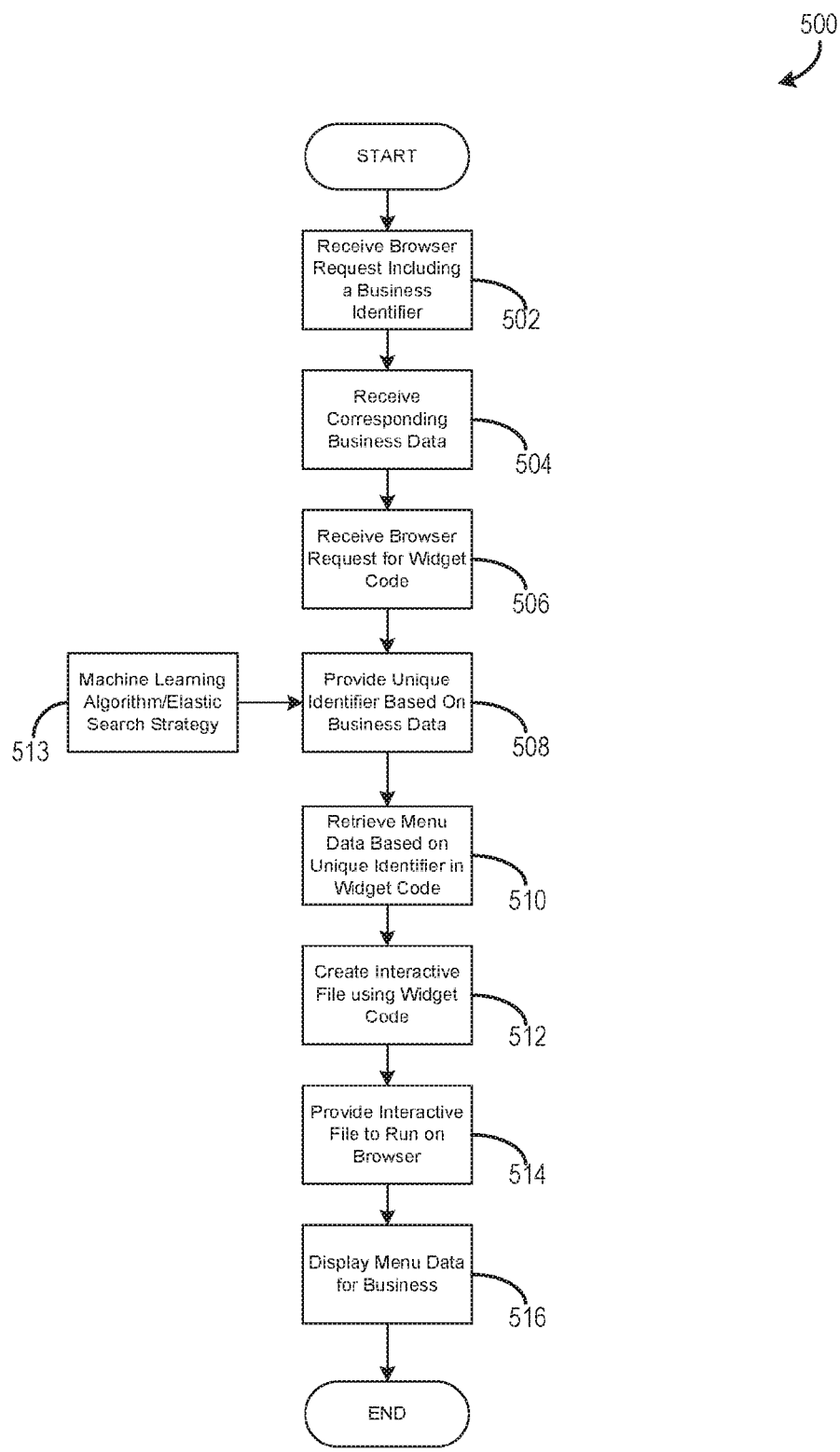
FIG. 8 is a flow chart setting forth the steps of processes for automatically providing restaurant input data to a customer through a third party provider using unique identifiers.

Specifically, turning now to FIG. 8, a flow chart is provided setting forth exemplary steps 500 for automatically providing input data to a customer through when the third party does not store or know the unique identifiers. To start the process, the order engine may receive a request from the browser including a business identifier (i.e., the identifying information provided by the third party for a particular business, such as name, address and city information) at process block 502. In response to the browser request, the browser may identify a widget tag, for example, in the HTML. In one non-limiting example, the widget tag may be stored by the local browser and may have the following format:

```
<script
src="http://widget.locu.com/?name=Bistro+Central+parc&address=560+sutter
+st&city=San+Francisco" element="menu_content">
```

Once the browser identifies the widget tag, the order engine may receive the corresponding business input data from the third party at process block 504 that corresponds to the business identifier information. Next, at process block 506, the order engine may receive a browser request for the widget code, for example. Next, at process block 508, the order engine matches the given business input data provided to the business input data stored on the remote content source 10, for example, of FIG. 1 in order to provide a unique identifier.

In one non-limiting example, a machine learning algorithm and elastic search strategy, as shown at block 513, may be configured to initiate the order engine to search for and discover new keywords corresponding to the business input data. Thus, the machine learning algorithm and elastic search strategy may be used by the order engine to compensate for any discrepancies between the business input data provided and the business input data available to the order engine. In one example, the machine learning algorithm and elastic search strategy at block 513 may be based on genetic mutations, for example, that use a set of mutation functions, such as phrase splitting, word joining, word stemming, order changing, and so on, to compensate for any discrepancies between the business input data provided by the third party and the business input data provided by the order engine.

Another example of the machine learning algorithm and elastic search strategy at block 513 may be a phrase extension mutator. The phrase extension mutator may be configured to combine keywords identified in the business input data provided by the third party and the business input data provided by the order engine. For example, if the business name provided by the third party includes "bistro," "central," and "park," for example, the phrase extension mutator may combine the keywords into the complete business name "bistro central park", which may be the business name stored on the remote content source accessible by the order engine. Additionally, or alternatively, the phrase extension mutator may combine keywords with a set of handpicked verbs or phrases for the particular business.

Another example of the machine learning algorithm and elastic search strategy at block 513 may be a synonym finder. The synonym finder may be configured to randomly substitute words in a given phrase for known synonyms or similar items and categories associated with the keyword corresponding to the business input data. In so doing, the synonym finder will likely indicate to the order engine that the word "street" may be substituted with "st.". Thus, if the third party provides business input data including a business address that includes the word "street," and the business input data provided by the order engine includes a business address with the abbreviation "st.", the machine learning algorithm and elastic search strategy will compensate for this discrepancy in order for the order engine to provide the correct unique identifier at process block 508. Additionally, or alternatively, the machine learning algorithm and elastic search strategy may be a keyword generalizer, for example. The keyword generalize may be configured to remove pluralization or stop words, for example, from the business input data that may vary between the third party and the order engine.

Once the unique identifier is determined at process block 508, at process block 510, the order engine may retrieve the menu data (i.e., the menu_content identified in the widget tag) from the remote content source based on the unique identifier. Next, at process block 512, the order engine may be configured to create an interactive or executable file, for example a JavaScript file, using the widget code and the business data, such as menu data, embedded in the widget tag. Once the interactive file is created, the order engine may provide the interactive file to run on the browser at process block 514. Thus, the browser runs the widget code and finds the business data (i.e., the menu_content element identified in the widget tag) within the content provided by the third party. Then at process block 516, the business data is displayed for the business corresponding to the unique identifier. Thus, the user is provided with an interactive menu, for example, for the business identified in the content provided by the third party.

In some cases, the third party choose not to work with or be capable of communicating with the order engine to obtain the unique identifier corresponding to each business. In this case, a program, application, script, extension, or similar construct may be used to determine the unique identifier or otherwise connect the order engine with the content and provide the content to the end user. The script may be a JavaScript, for example, that automatically determines the unique identifier for each business by scanning the content of the third party. Thus, the third party can run the script so that menus, for example, can be provided for the businesses referenced in the third party's content.

In yet another non-limiting example, if the third party chooses not to use the unique identifier or actively participate in connecting the content with information, such as menus, available using the unique identifier, a user-side script, application, or widget, for example, may be used. For example, if the user is accessing an online newspaper from a computer, the client-side script, application, or widget can be used to scan the content of the online news paper to identify businesses or business information and access the unique identifiers corresponding to each business. Once the unique identifiers are obtained, the order engine may provide the business information, such as a menu, for the business to the user.

Figure 9:
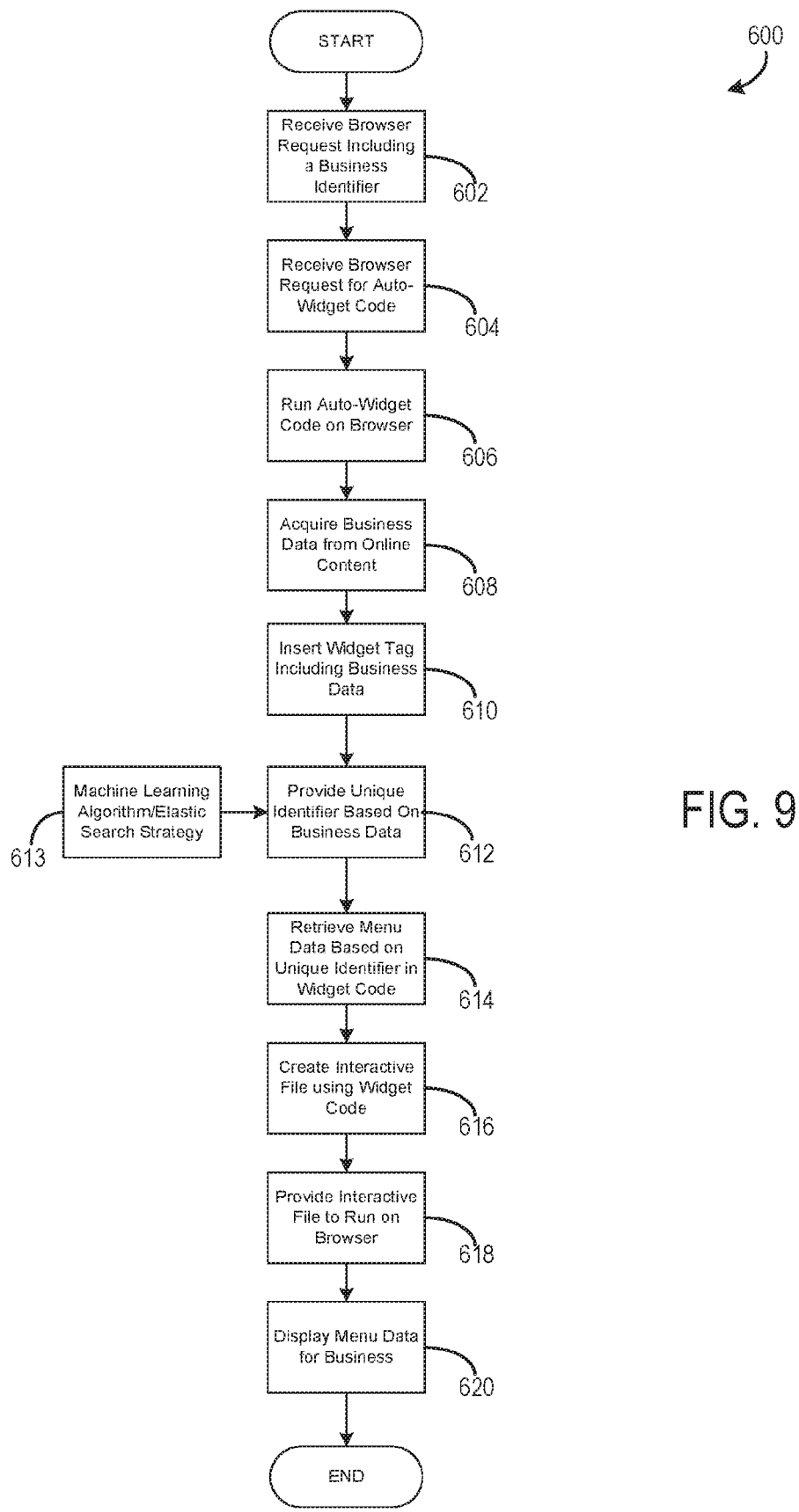
FIG. 9 is a flow chart setting forth the steps of processes for automatically providing restaurant input data to a customer through a third party provider using unique identifiers.

Turning now to FIG. 9, a flow chart is provided setting forth exemplary steps 600 for automatically providing restaurant input data to a customer based on business identified in a third party's content, when the third party does not know or have the capability to communicate to determine the unique identifiers. In this example, the third party does not actively provide business input data, such as a business name, address, and phone number as the business identifier. Thus, the order engine is required to automatically identify the business input data within the content by providing automatic widget code, for example, that is used to access the third party's online content. In one non-limiting example, the automatic widget code may be stored on the remote content source 10 of FIG. 1 and may have the following format:

<script src="http://widget.locu.com/auto">

The corresponding business input data is determined by scanning the third party's online content to identify business input data (i.e., business name, address, and phone number) and then matched with the business input data stored on the remote content source. As previously described, the business input data identified within the third party content may be inconsistent with the business input data stored and accessible to the order engine on the remote content source. Therefore, a machine learning algorithm and elastic search strategy may be utilized.

Returning to FIG. 9, to start the process, the order engine may receive a request from the browser at process block 602. In response to the browser request, the browser may identify a widget tag. In one non-limiting example, the widget tag may be stored by the local browser and may have the following format:

<script src="http://widget.locu.com/auto>

Once the browser identifies the widget tag, the order engine may receive a browser request for the automatic widget code from the remote content source at process block 604. The order engine may then provide the automatic widget code to the browser and run the automatic widget code at process block 606. Running the automatic widget code enables a scan of the third party content and acquisition of the business input data (e.g., business name, address, and phone number) from the online content at process block 608.

In one non-limiting example, the automatic widget code may scan the third party contents to find a business name and address, such as "Bistro Central Park, 560 Central St, San Francisco, Calif. 94117". The automatic widget code may be configured to identify microformats, for example, to standardize how the automatic widget codes scans the online content for business input data. For example, the online content may be scanned for suitably formatted hCards to allow the order engine to automatically process the business input data, such as the address. Additionally, or alternatively, the order engine may use third party-specific modifications to identify the business input data within the third party content. Further still, the order engine may simply scan and determine the business input data despite any clear indicators of business input data within the third party content. In this case, contextual analysis may be performed, such as looking for proximately located information that generally matches an address format or the like.

Once the business input data is acquired at process block 608, the order engine may be configured to insert another widget tag, including the identified business input data at process block 610. The browser may identify the widget tag, for example, in the HTML. In one non-limiting example, the widget tag may be stored by the local browser and may have the following format:

```
<script
src="http://widget.locu.com/?name=Bistro+Central+parc&address=560+sutter
+st&city=San+Francisco">
```

Next, at process block 612, the order engine matches the business input data identified by the automatic widget code to the business input data stored on the remote content source 10, for example, of FIG. 1 in order to provide a unique identifier. As previously described, the machine learning algorithm and elastic search strategy, as shown at block 613, may be configured to initiate the order engine to search for and discover new keywords corresponding to the business input data. Thus, the machine learning algorithm and elastic search strategy may be used by the order engine to fix any discrepancies between the business input data identified by the automatic widget code and the business input data provided by the order engine. The machine learning algorithm and elastic search strategy may be based on, as previously described, genetic mutations, a phrase extension mutator, a synonym finder, and/or a keyword generalizer, for example.

Once the unique identifier is provided at process block 612, at process block 614, the order engine may retrieve the menu data from the remote content source corresponding to the unique identifier. Next, at process block 616, the order engine may be configured to create an interactive or executable file, for example a JavaScript file, using the widget code and the menu data embedded in the widget tag. Once the interactive file is created, the order engine may provide the interactive file to run on the browser at process block 618. Thus, the browser runs the widget code. Thus, at process block 620, the menu data is displayed for the business information found within the third party content. That is, the user is provided with an interactive menu, for example, for the business identified in the content provided by the third party.

The above described script, application, and/or widget used to identify businesses included in the third party's content is not limited to online newspapers. Additionally, or alternatively, the script, application, and/or widget may be deployed in web browsers as a browser extension. For example, the browser extension may be a Google Chrome Extension that provides a user the ability to hover over a web-link, for example, to return the menu corresponding to one or more businesses displayed by the web browser. Thus, the user may be provided the business menu and the ability to place an online order for the business through the order engine.

The above described systems and methods enable businesses, such as restaurants, to receive more business via existing communication methods and provides the opportunity for a restaurant to enroll in a take-out service. An additional benefit to the resulting service is that it allows the take-out order service's company to acquire new restaurant customers for its services at a low cost and at scale provided the prerequisites are met.

The present invention has been described in terms of one or more preferred embodiments, and it should be appreciated that many equivalents, alternatives, variations, and modifications, aside from those expressly stated, are possible and within the scope of the invention.

The invention claimed is:

1. A system comprising at least one hardware computing device coupled to a network and comprising at least one processor executing specific computer-executable instructions that, when executed, cause the system to:
   receive, from a client computing device coupled to the network, a request to execute a script referenced within an HTML script tag of a source code for a web page displayed on a web browser running on the client computing device, the HTML script tag comprising at least one script source attribute referencing a URL for the script, which, when executed:
     identifies, within the source code content of the web page, a business identification data for a business; and
     transmits the business identification data to the at least one hardware computing device;
   execute a database query to identify, within a database coupled to the network;
     a unique business identifier associated, in the database, with the business identification data and the business; and
     a supplemental or modified content to be displayed on the web page providing access to a business offering data associated in the database with the unique business identifier;
   transmit the web page, including the supplemental or modified content, for display on the client computing device;
   receive, from the client computing device, an online order, comprising a selection of the business offering data, to be placed with the business;
   submit the online order to the business; and
   provide at least one response option for the business to communicate acceptance of the online order.

2. The system as recited in claim 1, wherein the script is configured to run in a web browser.

3. The system as recited in claim 1, wherein the script is configured to run as a browser extension to enable a user operating the client computing device to engage a web-link to return the business offering data to the user.

4. The system as recited in claim 1, wherein the business offering data includes at least one of a business menu including a plurality of business offerings, a business location, a business phone number, a business fax number, a business email address, business delivery hours, business pick-up hours, photographs of the plurality of business offerings, and feedback data.

5. The system as recited in claim 1, wherein the unique business identifier is a numerical value.

6. The system as recited in claim 1, wherein the processor is further configured to automatically determine the unique business identifier corresponding to the business by scanning a content displayed on the client computing device.

7. The system as recited in claim 1, wherein the computer-executable instructions are further configured to carry out the step of providing the business an option to establish a business relationship for subsequent online orders from potential customers.

8. The system as recited in claim 1, wherein the computer-executable instructions are further configured to carry out the steps of:
determining whether a user has an existing account corresponding to the business indicated within the content displayed on the client computing device;
prompting the user to generate a new account when no existing account associated with the user is present; and
receiving data related to the user to be stored in the database, the user data configured to automatically be generated for subsequent online orders.

9. The system as recited in claim 1, wherein the computer-executable instructions are further configured to carry out the step of providing an estimated cost of the online order the estimated cost based on items selected by the user from the business offering data.

10. The system as recited in claim 1, wherein the online order is submitted via a non-verbal communication platform and the at least one response option to the business includes at least one of a repeat message option, an accept order option, a connect to customer option, a connect to a service provider option, a decline order option, and an opt-out option.

11. A method comprising the steps of:
receiving, by at least one hardware computing device coupled to a network and comprising at least one processor executing specific computer-executable instructions, from a client computing device coupled to the network, a request to execute a script referenced within an HTML script tag of a source code for a web page displayed on web browser running on the client computing device, the HTML script tag comprising at least one script source attribute referencing a URL for the script, which, when executed:
identifies, within the source code content of the web page, a business identification data for a business; and
transmits the business identification data to the at least one hardware computing device;
executing a database query to identify, within a database coupled to the network:
a unique business identifier associated, in the database, with the business identification data and the business; and
a supplemental or modified content to be displayed on the web page providing access to a business offering data associated in the database with the unique business identifier;
transmitting the web page, including the supplemental or modified content, for display on the client computing device;
receiving, from the computing device, an online order, comprising a selection of the business offering data, to be placed with the business;
submitting the online order to the business; and
providing at least one response option for the business to communicate acceptance of the online order.

12. The method as recited in claim 11, further comprising the step of running the script in a web browser.

13. The method as recited in claim 11, further comprising the step of configuring the script to run as a browser extension to enable a user operating the client computing device to engage a web-link to return the business offering data to the user.

14. The method as recited in claim 11, wherein the business offering includes at least one of a business menu including a plurality of business offerings, a business location, a business phone number, a business fax number, a business email address, business delivery hours, business pick-up hours, photographs of the plurality of business offerings, and feedback data.

15. The method as recited in claim 11, wherein the unique business identifier is a numerical value.

16. The method as recited in claim 11, further comprising the step of determining the unique business identifier corresponding to the business automatically by scanning a content displayed on the client computing device.

17. The method as recited in claim 11, further comprising the step of providing the business an option to establish a business relationship for subsequent online orders from potential customers.

18. The method as recited in claim 11, further comprising the steps of:
determining whether a user has an existing account corresponding to the business indicated within the content displayed on the client computing device;
prompting the user to generate a new account when no existing account associated with the user is present; and
receiving data related to the user to be stored in the database, the user data configured to automatically be generated for subsequent online orders.

19. The method as recited in claim 11, further comprising the step of providing an estimated cost of the online order, the estimated cost based on items selected by the user from the business offering data.

20. The method as recited in claim 11, further comprising the step of submitting the online order via a non-verbal communication platform and providing the at least one response option to the business in the form of at least one of a repeat message option, an accept order option, a connect to customer option, a connect to a service provider option, a decline order option, and an opt-out option.

* * * * *